United States Patent
Bamba

(10) Patent No.: US 11,429,363 B2
(45) Date of Patent: Aug. 30, 2022

(54) INFORMATION PROCESSING APPARATUS AND FILE COPYING METHOD

(71) Applicant: Sony Interactive Entertainment Inc., Tokyo (JP)

(72) Inventor: Syunsuke Bamba, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 173 days.

(21) Appl. No.: 16/627,514

(22) PCT Filed: Jul. 24, 2018

(86) PCT No.: PCT/JP2018/027684
§ 371 (c)(1),
(2) Date: Dec. 30, 2019

(87) PCT Pub. No.: WO2019/026686
PCT Pub. Date: Feb. 7, 2019

(65) Prior Publication Data
US 2020/0167142 A1    May 28, 2020

(30) Foreign Application Priority Data

Jul. 31, 2017 (JP) ............................. JP2017-148127

(51) Int. Cl.
*A63F 13/77* (2014.01)
*A63F 13/52* (2014.01)
*G06F 8/61* (2018.01)

(52) U.S. Cl.
CPC ................ *G06F 8/61* (2013.01); *A63F 13/52* (2014.09); *A63F 13/77* (2014.09); *A63F 2300/206* (2013.01); *A63F 2300/552* (2013.01)

(58) Field of Classification Search
CPC .... A63F 13/52; A63F 13/77; A63F 2300/206; A63F 2300/552; G06F 8/61
See application file for complete search history.

(56) References Cited

U.S. PATENT DOCUMENTS 4,321,635 A * 3/1982 Tsuyuguchi ......... G11B 15/005
4,727,365 A * 2/1988 Bunker .................. G06T 15/80
345/428

(Continued)

FOREIGN PATENT DOCUMENTS

WO 2011021408 A1 2/2011

OTHER PUBLICATIONS

International Preliminary Report on Patentability and Written Opinion for corresponding PCT Application No. PCT/JP2018/027684, 13 pages, dated Feb. 28, 2020.

(Continued)

*Primary Examiner* — David L Lewis
*Assistant Examiner* — Matthew D Hoel
(74) *Attorney, Agent, or Firm* — Matthew B. Dernier, Esq.

(57) ABSTRACT

A read-only-memory (ROM) medium in which a file constituting application software and an additional content file are recorded is mounted to a media drive. A recording processing section copies the file recorded in the ROM medium to an auxiliary storage device. After copying the additional content file to the auxiliary storage device, the recording processing section copies the file constituting the application software to the auxiliary storage device. In the case where the additional content file downloaded from a content server is stored in the auxiliary storage device, the application software can utilize both the additional content file copied from the ROM medium to the auxiliary storage device and the additional content file downloaded from the content server into the auxiliary storage device.

7 Claims, 4 Drawing Sheets

(56) References Cited

U.S. PATENT DOCUMENTS

| | | | | |
|---|---|---|---|---|
| 4,807,158 A * | 2/1989 | Blanton | ................ | G09B 9/301 |
| | | | | 345/581 |
| 4,860,197 A * | 8/1989 | Langendorf | ........ | G06F 9/30152 |
| | | | | 712/238 |
| 4,905,168 A * | 2/1990 | McCarthy | ................ | A63F 13/40 |
| | | | | 345/530 |
| 4,943,908 A * | 7/1990 | Emma | ................ | G06F 9/3806 |
| | | | | 712/240 |
| 4,980,823 A * | 12/1990 | Liu | ................ | G06F 12/0862 |
| | | | | 711/136 |
| 5,014,327 A * | 5/1991 | Potter | ................ | G06K 9/6276 |
| | | | | 382/218 |
| 5,155,849 A * | 10/1992 | Westfall | ................ | G06F 9/454 |
| | | | | 707/999.203 |
| 5,305,389 A * | 4/1994 | Palmer | ................ | G06F 12/0862 |
| | | | | 707/999.102 |
| 5,416,903 A * | 5/1995 | Malcolm | ................ | G06F 9/454 |
| | | | | 704/8 |
| 5,434,776 A * | 7/1995 | Jain | ................ | G06F 3/04895 |
| | | | | 704/8 |
| 5,574,836 A * | 11/1996 | Broemmelsiek | ..... | H04N 13/279 |
| | | | | 348/E13.019 |
| 5,583,761 A * | 12/1996 | Chou | ................ | G06F 9/454 |
| | | | | 715/201 |
| 5,678,039 A * | 10/1997 | Hinks | ................ | G06F 9/454 |
| 5,699,497 A * | 12/1997 | Erdahl | ................ | G06T 15/04 |
| | | | | 345/428 |
| 5,748,867 A * | 5/1998 | Cosman | ................ | G09B 9/301 |
| | | | | 345/428 |
| 5,769,718 A * | 6/1998 | Rieder | ................ | A63F 13/52 |
| | | | | 463/31 |
| 5,899,810 A * | 5/1999 | Smith | ................ | A63F 13/12 |
| | | | | 463/42 |
| 5,917,484 A * | 6/1999 | Mullaney | ................ | G06F 9/454 |
| | | | | 704/8 |
| 5,996,015 A * | 11/1999 | Day | ................ | H04N 21/4143 |
| | | | | 348/E7.071 |
| 6,002,738 A * | 12/1999 | Cabral | ................ | G06T 11/006 |
| | | | | 378/4 |
| 6,205,418 B1 * | 3/2001 | Li | ................ | G06F 40/58 |
| | | | | 704/8 |
| 6,319,129 B1 * | 11/2001 | Igarashi | ................ | A63F 13/52 |
| | | | | 463/31 |
| 6,320,580 B1 * | 11/2001 | Yasui | ................ | G06T 15/40 |
| | | | | 345/421 |
| 6,356,288 B1 * | 3/2002 | Freeman | ................ | G06F 3/0481 |
| | | | | 463/31 |
| 6,361,438 B1 * | 3/2002 | Morihira | ................ | G06T 15/50 |
| | | | | 463/31 |
| 6,396,515 B1 * | 5/2002 | Hetherington | .......... | G06F 9/454 |
| | | | | 704/8 |
| 6,411,298 B1 * | 6/2002 | Goto | ................ | G06T 15/20 |
| | | | | 345/419 |
| 6,496,189 B1 * | 12/2002 | Yaron | ................ | G06T 15/40 |
| | | | | 345/428 |
| 6,529,206 B1 * | 3/2003 | Ohki | ................ | G06T 15/20 |
| | | | | 345/619 |
| 6,559,861 B1 * | 5/2003 | Kennelly | ................ | G06F 9/454 |
| | | | | 715/744 |
| 6,738,059 B1 * | 5/2004 | Yoshinaga | ................ | A63F 13/54 |
| | | | | 345/419 |
| 6,744,442 B1 * | 6/2004 | Chan | ................ | G06T 15/04 |
| | | | | 345/582 |
| 6,764,403 B2 * | 7/2004 | Gavin | ................ | A63F 13/10 |
| | | | | 463/43 |
| 6,803,910 B2 * | 10/2004 | Pfister | ................ | G06T 9/001 |
| | | | | 345/426 |
| 6,853,382 B1 * | 2/2005 | Van Dyke | ................ | G09G 5/39 |
| | | | | 345/544 |
| 6,864,895 B1 * | 3/2005 | Tidwell | ................ | G06T 1/60 |
| | | | | 345/530 |
| 6,903,738 B2 * | 6/2005 | Pfister | ................ | G06T 17/20 |
| | | | | 345/426 |
| 6,947,896 B2 * | 9/2005 | Hanson | ................ | G10L 13/00 |
| | | | | 704/E15.04 |
| 6,999,094 B1 * | 2/2006 | Ito | ................ | A63F 13/10 |
| | | | | 463/31 |
| 7,007,026 B2 * | 2/2006 | Wilkinson | .......... | G06F 16/9574 |
| | | | | 707/999.102 |
| 7,024,546 B2 * | 4/2006 | Real | ................ | G06F 9/454 |
| | | | | 713/1 |
| 7,031,966 B2 * | 4/2006 | Kedem | ................ | G06F 3/065 |
| 7,039,867 B1 * | 5/2006 | Scheidig | ................ | G06F 3/033 |
| | | | | 715/810 |
| 7,194,506 B1 * | 3/2007 | White | ................ | G06F 16/9574 |
| | | | | 709/246 |
| 7,194,580 B2 * | 3/2007 | Shiraishi | ................ | G06F 11/1096 |
| | | | | 714/E11.034 |
| 7,240,235 B2 * | 7/2007 | Lewalski-Brechter | ................ | |
| | | | | G06F 11/1076 |
| | | | | 709/219 |
| 7,293,235 B1 * | 11/2007 | Powers | ................ | G06T 7/20 |
| | | | | 463/9 |
| 7,337,273 B2 * | 2/2008 | Schmidt | ................ | G06F 12/0866 |
| | | | | 711/E12.019 |
| 7,401,187 B2 * | 7/2008 | Lange | ................ | G06F 12/0888 |
| | | | | 711/138 |
| 7,464,334 B2 * | 12/2008 | Miller | ................ | G06F 9/454 |
| | | | | 704/8 |
| 7,613,737 B2 * | 11/2009 | Ozaki | ................ | H04L 41/22 |
| | | | | 707/999.102 |
| 7,711,759 B2 * | 5/2010 | Seo | ................ | H04N 9/8715 |
| | | | | 707/823 |
| 7,747,823 B2 * | 6/2010 | Schmidt | ................ | G06F 12/0866 |
| | | | | 711/201 |
| 7,769,920 B2 * | 8/2010 | Kimura | ................ | G11B 27/329 |
| | | | | 707/831 |
| 7,869,733 B2 * | 1/2011 | Sato | ................ | G03G 15/502 |
| | | | | 399/82 |
| 7,895,076 B2 * | 2/2011 | Kutaragi | ................ | A63F 13/525 |
| | | | | 705/14.43 |
| 7,949,882 B2 * | 5/2011 | Miyawaki | ................ | H04L 69/40 |
| | | | | 713/188 |
| 8,062,128 B2 * | 11/2011 | Jobe | ................ | A63F 13/525 |
| | | | | 463/31 |
| 8,133,115 B2 * | 3/2012 | Campbell | .......... | A63F 13/5372 |
| | | | | 463/31 |
| 8,204,272 B2 * | 6/2012 | Marks | ................ | H04N 19/61 |
| | | | | 358/518 |
| 8,267,783 B2 * | 9/2012 | van Datta | .......... | H04N 21/4825 |
| | | | | 463/31 |
| 8,272,964 B2 * | 9/2012 | van Datta | .......... | H04N 21/8583 |
| | | | | 463/43 |
| 8,284,310 B2 * | 10/2012 | Mallinson | ................ | H04N 5/04 |
| | | | | 348/515 |
| 8,289,325 B2 * | 10/2012 | Green | ................ | G06T 15/50 |
| | | | | 345/426 |
| 8,294,732 B2 * | 10/2012 | Cheng | ................ | H04N 5/2224 |
| | | | | 345/619 |
| 8,307,308 B2 * | 11/2012 | Hamilton, II | .......... | G06F 3/011 |
| | | | | 715/848 |
| 8,317,606 B2 * | 11/2012 | Graham | ................ | A63F 13/71 |
| | | | | 463/32 |
| 8,416,247 B2 * | 4/2013 | Zalewski | ................ | G06Q 30/02 |
| | | | | 348/169 |
| 8,529,346 B1 * | 9/2013 | Johnston | ................ | A63F 13/95 |
| | | | | 463/31 |
| 8,574,074 B2 * | 11/2013 | van Datta | ................ | G06Q 30/0276 |
| | | | | 463/31 |
| 8,608,560 B1 * | 12/2013 | Perrone | ................ | G07F 17/3211 |
| | | | | 463/31 |
| 8,616,966 B2 * | 12/2013 | Bennett | ................ | G07F 17/3272 |
| | | | | 463/28 |
| 8,626,584 B2 * | 1/2014 | van Datta | ................ | G06Q 30/02 |
| | | | | 705/14.54 |
| 8,626,771 B2 * | 1/2014 | Fowler | ................ | G06Q 30/02 |
| | | | | 707/748 |

(56) References Cited

U.S. PATENT DOCUMENTS

| | | | | |
|---|---|---|---|---|
| 8,645,992 B2* | 2/2014 | Russell | G06Q 30/0269 | 725/34 |
| 8,667,404 B2* | 3/2014 | Maillot | G06F 3/04842 | 717/109 |
| 8,676,900 B2* | 3/2014 | Yruski | G06Q 30/0277 | 705/14.1 |
| 8,701,004 B2* | 4/2014 | Hoerentrup | G06F 9/454 | 715/716 |
| 8,719,731 B2* | 5/2014 | Hamilton, II | G06F 3/0484 | 715/848 |
| 8,763,090 B2* | 6/2014 | Capati | G06F 21/10 | 725/3 |
| 8,763,157 B2* | 6/2014 | Navar | H04L 63/0457 | 726/27 |
| 8,769,558 B2* | 7/2014 | Navar | G06Q 30/0269 | 725/14 |
| 8,795,076 B2* | 8/2014 | van Datta | H04N 21/4781 | 463/31 |
| 8,838,729 B2* | 9/2014 | Estrada | G06F 16/951 | 709/224 |
| 8,892,495 B2* | 11/2014 | Hoffberg | G06N 5/048 | 706/48 |
| 9,015,747 B2* | 4/2015 | Russell | H04N 21/812 | 725/34 |
| 9,113,229 B2* | 8/2015 | Hao | H04N 21/812 | |
| 9,122,380 B2* | 9/2015 | Hamilton, II | G06F 16/285 | |
| 9,129,301 B2* | 9/2015 | van Datta | G06Q 30/0257 | |
| 9,138,648 B2* | 9/2015 | Gavin | A63F 13/10 | |
| 9,195,991 B2* | 11/2015 | van Datta | G06Q 30/02 | |
| 9,220,987 B2* | 12/2015 | Obana | A63F 13/798 | |
| 9,269,220 B2* | 2/2016 | Antkowiak | G06F 16/95 | |
| 9,272,203 B2* | 3/2016 | Zalewski | A63F 13/25 | |
| 9,275,075 B2 | 3/2016 | Isobe | | |
| 9,286,367 B2* | 3/2016 | Estrada | G06F 16/27 | |
| 9,308,449 B2* | 4/2016 | Frattinger | G07F 17/323 | |
| 9,342,817 B2* | 5/2016 | Elliott | H04L 51/52 | |
| 9,345,973 B1* | 5/2016 | Antkowiak | G07F 17/3225 | |
| 9,367,862 B2* | 6/2016 | Yruski | G06Q 30/02 | |
| 9,443,340 B2* | 9/2016 | Miyagi | G06T 15/20 | |
| 9,466,074 B2* | 10/2016 | van Datta | A63F 13/5258 | |
| 9,471,996 B2* | 10/2016 | Maillot | G06T 15/04 | |
| 9,474,971 B2* | 10/2016 | Hayashida | A63F 13/48 | |
| 9,474,976 B2* | 10/2016 | Capati | G06F 16/9535 | |
| 9,498,720 B2* | 11/2016 | Geisner | A63F 13/75 | |
| 9,525,902 B2* | 12/2016 | Navar | G06Q 30/0269 | |
| 9,531,686 B2* | 12/2016 | Navar | H04L 67/06 | |
| 9,535,563 B2* | 1/2017 | Hoffberg | H04N 5/782 | |
| 9,619,936 B2* | 4/2017 | Park | G06T 11/001 | |
| 9,619,959 B2* | 4/2017 | Antkowiak | G06F 40/143 | |
| 9,672,691 B2* | 6/2017 | Antkowiak | G07F 17/3244 | |
| 9,713,763 B2* | 7/2017 | Gagner | G07F 17/322 | |
| 9,715,788 B2* | 7/2017 | Bennett | G07F 17/3272 | |
| 9,805,096 B2* | 10/2017 | Yutaka | G06F 16/24578 | |
| 9,864,998 B2* | 1/2018 | Yruski | G06Q 30/0241 | |
| 9,870,571 B1* | 1/2018 | LaMontagne | A63F 13/30 | |
| 9,873,052 B2* | 1/2018 | Van Datta | A63F 13/50 | |
| 9,892,535 B1* | 2/2018 | Guy | G06F 3/048 | |
| 9,904,442 B2* | 2/2018 | Hamilton, II | G06F 16/285 | |
| 9,904,943 B1* | 2/2018 | LaMontagne | G06Q 30/0251 | |
| 9,984,388 B2* | 5/2018 | van Datta | G06Q 30/0251 | |
| 10,013,703 B2* | 7/2018 | LaMontagne | G06Q 30/0277 | |
| 10,042,987 B2* | 8/2018 | Navar | H04L 63/107 | |
| 10,046,239 B2* | 8/2018 | Van Datta | A63F 13/50 | |
| 10,062,090 B2* | 8/2018 | LaMontagne | G06Q 30/0246 | |
| 10,063,848 B2* | 8/2018 | Posa | H04N 21/431 | |
| 10,086,279 B2* | 10/2018 | Dun | A63F 13/12 | |
| 10,186,111 B2* | 1/2019 | Antkowiak | G07F 17/3225 | |
| 10,268,999 B2* | 4/2019 | Mocko | G06Q 20/20 | |
| 10,298,703 B2* | 5/2019 | Capati | A63F 13/73 | |
| 10,322,347 B2* | 6/2019 | Gavin | A63F 13/50 | |
| 10,380,579 B1* | 8/2019 | Hafemann | G06Q 20/40 | |
| 10,390,101 B2* | 8/2019 | Russell | G06Q 30/0269 | |
| 10,406,426 B2* | 9/2019 | Gagner | A63F 9/24 | |
| 10,410,248 B2* | 9/2019 | Yruski | H04L 67/306 | |
| 10,430,851 B2* | 10/2019 | Wheeler | G06F 16/5838 | |
| 10,453,236 B1* | 10/2019 | Guy | G06T 11/60 | |
| 10,460,526 B2* | 10/2019 | LaMontagne | G06T 17/20 | |
| 10,467,651 B2* | 11/2019 | van Datta | G06Q 30/0277 | |
| 10,478,720 B2* | 11/2019 | Gauthier | G06F 8/38 | |
| 10,496,970 B2* | 12/2019 | Renke | G06Q 30/0641 | |
| 10,600,072 B2* | 3/2020 | Lamontagne | G06Q 30/0242 | |
| 10,657,538 B2* | 5/2020 | Yruski | G06Q 30/0269 | |
| 10,733,588 B1* | 8/2020 | Mocko | G06Q 20/20 | |
| 10,754,513 B2* | 8/2020 | Hamilton, II | G06Q 30/02 | |
| 10,769,859 B2* | 9/2020 | LaMontagne | G06Q 30/0251 | |
| 10,786,736 B2* | 9/2020 | Weising | A63F 13/422 | |
| 10,789,611 B2* | 9/2020 | van Datta | H04N 21/4825 | |
| 10,825,256 B2* | 11/2020 | LaMontagne | G06Q 30/0251 | |
| 10,846,779 B2* | 11/2020 | Johnson | A63F 13/792 | |
| 10,860,987 B2* | 12/2020 | Cvetkovic | G06Q 10/1095 | |
| 10,931,991 B2* | 2/2021 | Sanghavi | H04N 21/4312 | |
| 10,965,994 B2* | 3/2021 | Guo | A63F 13/58 | |
| 11,004,089 B2* | 5/2021 | Yruski | G06Q 30/0269 | |
| 11,069,106 B1* | 7/2021 | Guy | G06T 11/60 | |
| 11,090,555 B2* | 8/2021 | Miao | A63F 13/95 | |
| 11,119,796 B2* | 9/2021 | Tsuchiya | G06F 9/454 | |
| 11,127,247 B2* | 9/2021 | Jin | G06F 16/9554 | |
| 11,195,185 B2* | 12/2021 | Yruski | H04L 67/53 | |
| 2002/0054097 A1* | 5/2002 | Hetherington | G06F 9/454 | 715/762 |
| 2002/0073090 A1* | 6/2002 | Kedem | G06F 11/1466 | |
| 2002/0133523 A1* | 9/2002 | Ambler | G06F 9/454 | 715/265 |
| 2002/0133551 A1* | 9/2002 | Ohba | G06F 9/954 | 715/753 |
| 2002/0194337 A1* | 12/2002 | Knight | G06F 21/6209 | 709/225 |
| 2003/0049017 A1* | 3/2003 | Chung | G11B 20/10527 | |
| 2003/0058238 A1* | 3/2003 | Doak | G06T 19/00 | 709/217 |
| 2003/0109313 A1* | 6/2003 | Gavin | A63F 13/50 | 463/43 |
| 2003/0110503 A1* | 6/2003 | Perkes | H04N 21/84 | 348/E7.071 |
| 2003/0179225 A1* | 9/2003 | Nettles | G06F 9/454 | 715/703 |
| 2004/0229701 A1* | 11/2004 | Gavin | A63F 13/10 | 463/43 |
| 2004/0250265 A1* | 12/2004 | Suzuki | G06F 8/62 | 719/321 |
| 2005/0063217 A1* | 3/2005 | Shiraishi | G06F 11/1096 | 714/E11.034 |
| 2005/0195975 A1* | 9/2005 | Kawakita | H04L 9/3236 | 380/30 |
| 2006/0143666 A1* | 6/2006 | Okada | G11B 27/034 | 725/89 |
| 2006/0146660 A1* | 7/2006 | Ikeda | G11B 27/3027 | 369/30.13 |
| 2006/0149910 A1* | 7/2006 | Kim | G11B 27/329 | 711/162 |
| 2006/0280447 A1* | 12/2006 | Ozaki | H04L 41/22 | 386/243 |
| 2007/0060346 A1* | 3/2007 | Edwards | A63F 13/332 | 463/31 |
| 2007/0094611 A1* | 4/2007 | Sasaki | G06F 16/68 | |
| 2008/0010119 A1* | 1/2008 | Oliveira | G06Q 30/02 | 705/14.55 |
| 2008/0028043 A1* | 1/2008 | Garbow | G06F 16/437 | 709/219 |
| 2008/0120648 A1* | 5/2008 | Carlson | H04N 21/64322 | 725/39 |
| 2008/0209474 A1* | 8/2008 | Pjanovic | H04N 21/44224 | 348/E7.061 |
| 2008/0253444 A1* | 10/2008 | Ho | H04N 21/632 | 348/E7.071 |
| 2008/0285957 A1* | 11/2008 | Yoshimura | H04N 21/44008 | 386/243 |
| 2008/0292353 A1* | 11/2008 | Sato | H04N 1/00917 | 399/82 |
| 2009/0025054 A1* | 1/2009 | Gibbs | H04N 21/466 | 725/127 |

(56) References Cited

U.S. PATENT DOCUMENTS

| | | | |
|---|---|---|---|
| 2009/0049389 A1* | 2/2009 | Kuzmanovic | G06F 9/451 715/745 |
| 2009/0144340 A1* | 6/2009 | Ferguson | H04L 67/104 |
| 2009/0153466 A1* | 6/2009 | Tilley | G06F 3/038 345/156 |
| 2009/0164287 A1* | 6/2009 | Kies | H04L 67/22 705/400 |
| 2010/0100909 A1* | 4/2010 | Arsenault | H04N 21/2541 725/39 |
| 2010/0121945 A1* | 5/2010 | Gerber | H04L 67/2842 709/223 |
| 2010/0138865 A1* | 6/2010 | Rai | H04N 21/4314 725/44 |
| 2010/0199179 A1* | 8/2010 | Suzuki | G06F 3/0488 345/173 |
| 2010/0268789 A1* | 10/2010 | Yoo | H04L 67/2842 709/214 |
| 2011/0010453 A1* | 1/2011 | Roy | G06F 21/335 709/240 |
| 2011/0177866 A1* | 7/2011 | Kim | A63F 13/73 463/43 |
| 2011/0296468 A1* | 12/2011 | Pettit | H04N 21/41265 725/62 |
| 2012/0182314 A1 | 7/2012 | Isobe | |
| 2012/0283026 A1* | 11/2012 | Gavin | A63F 13/60 463/43 |
| 2014/0201209 A1 | 7/2014 | Hashimoto | |
| 2014/0330579 A1* | 11/2014 | Cashman | G06Q 10/1095 705/2 |
| 2015/0215250 A1* | 7/2015 | Dinka | H04L 51/10 709/206 |
| 2015/0220250 A1* | 8/2015 | Nakata | G06F 3/04812 715/746 |
| 2015/0356018 A1* | 12/2015 | Hashimoto | A63F 13/77 711/112 |
| 2018/0158555 A1* | 6/2018 | Cashman | G06Q 10/1095 |
| 2020/0167142 A1* | 5/2020 | Bamba | A63F 13/77 |

OTHER PUBLICATIONS

Supplementary European Search Report for corresponding EP Application No. 18841794.3, 10 pages, dated Mar. 16, 2021.

International Search Report for corresponding PCT Application No. PCT/JP2018/027684, 2 pages, dated Oct. 2, 2018.

* cited by examiner

GAME SOFTWARE
PATCH FILE
ADDITIONAL CONTENT FILE

44

60

100 RECORDING PROCESSING SECTION

102 DISPLAY PROCESSING SECTION

104 APPLICATION EXECUTING SECTION

32 MEDIA DRIVE

2 AUXILIARY STORAGE DEVICE

44

INFORMATION PROCESSING APPARATUS AND FILE COPYING METHOD

TECHNICAL FIELD

The present invention relates to a technology which is implemented in an information processing apparatus such as a game apparatus.

BACKGROUND ART

Game software includes a startup file, a resource file group for running a game such as a game program, and a file group which an operating system (OS) of a game apparatus uses.

PTL 1 proposes a group configure in which game software is divided into a plurality of groups, and one group (first group) of the plurality of groups is constituted in such a way that a program file necessary for activation of game software, and a data file belong to the first group. PTL 1 discloses a technology in which while data recorded in a read-only memory (ROM) medium is read out to a buffer to be provided to a game, the data thus read out is recorded in an auxiliary storage device, and the data is copied from the ROM medium as a low-speed device to an auxiliary storage device as a high-speed device. At this time, the file recording is managed in units of a group, thereby enabling copy processing to be efficiently executed.

CITATION LIST

Patent Literature

[PTL 1] U.S. Patent Application Publication No. 2014/201209

SUMMARY

Technical Problem

Heretofore, the game software has been propagated and sold in the form of a ROM medium such as an optical disc, a magneto-optical disc, or a Blue-ray disc. Along with the speeding up of data communication, recently, it has also become normal that a content server delivers an image file of the game software via the Internet.

In general, after the first edition of the game software is released, a scenario, a character and the like are added to the game software, so that the view of the world of the game is expanded. The added scenario and character are delivered as an additional content from the content server to a terminal apparatus of a user, so that the user enjoys the additional content.

At present, with respect to the acquisition of the additional content, the user has no choice but to exclusively depend on the delivery from the content server. Then, it is desirable to construct a mechanism with which the additional content is delivered in the form of another form.

In the light of the foregoing, it is desirable for the present invention to realize a mechanism for providing an additional content to a user.

Solution to Problem

In order to solve the problem described above, an information processing apparatus according to a certain aspect of the present invention includes: a drive device to which a recording medium in which a file constituting application software and an additional content file are recorded is mounted; and a recording processing section copying the file recorded in the recording medium to an auxiliary storage device. After copying the additional content file to the auxiliary storage device, the recording processing section copies the file constituting the application software to the auxiliary storage device.

Another aspect of the present invention is a method of copying a file from a recording medium to an auxiliary storage device including the steps of: reading out an additional content file from the recording medium in which the file constituting application software and the additional content file are recorded, and copying the additional content file thus read out to the auxiliary storage device; and reading out the file constituting the application software from the recording medium, and copying the file to the auxiliary storage device.

It is to be noted that an arbitrary combination of the above constituent elements, and the matters obtained by transforming expression of the present invention with a method, an apparatus, a system, a recording medium, a computer program or the like are also valid as aspects of the present invention.

DESCRIPTION OF EMBODIMENT

Figure 1:
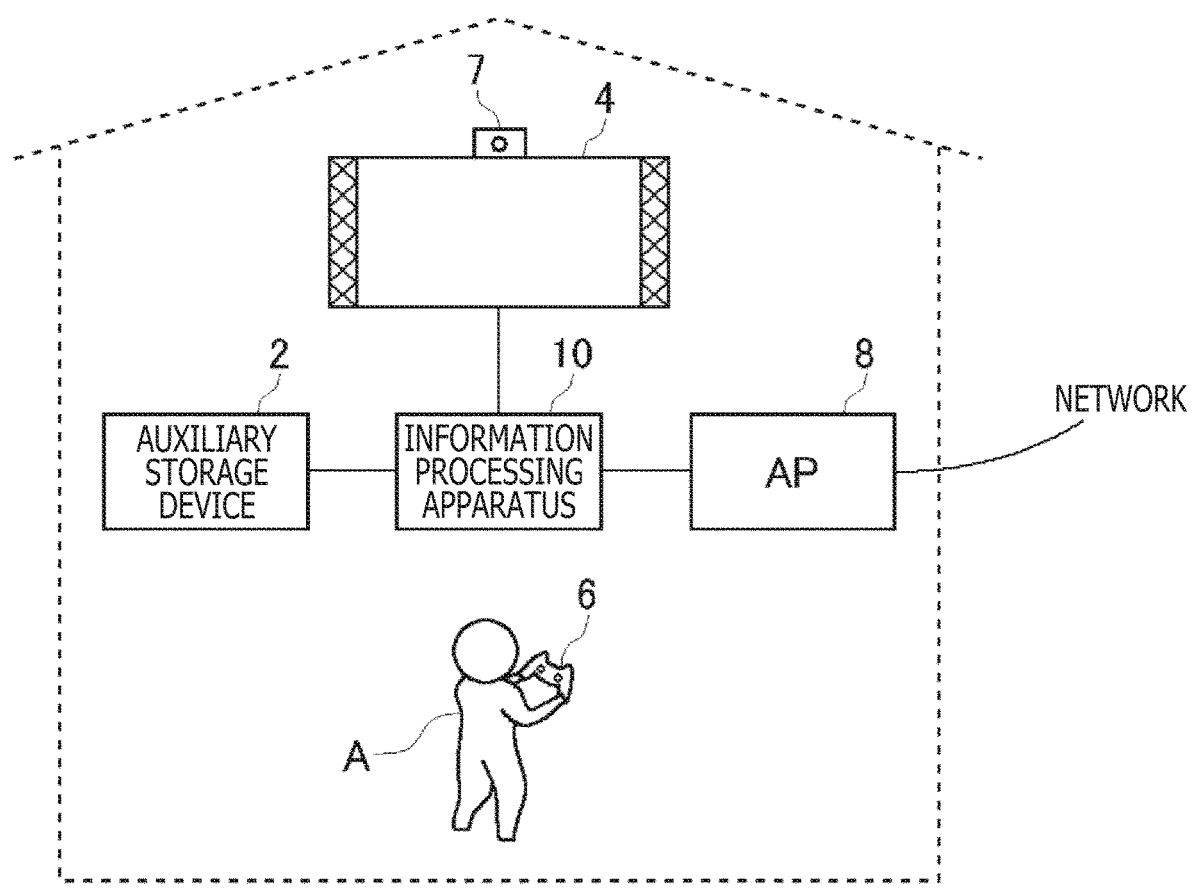
FIG. 1 is a diagram depicting an information processing system according to an embodiment.

FIG. 1 depicts an information processing system 1 according to an embodiment of the present invention. The information processing system 1 includes an information processing apparatus 10, an auxiliary storage device 2, and an output apparatus 4. An access point (hereinafter, referred to as "an AP") 8 has a function of a wireless access point and a router, and the information processing apparatus 10 is connected to the AP 8 in a wireless or wired manner, and is communicably connected to a content server on a network.

The information processing apparatus 10 is connected to an input apparatus 6 which a user A manipulates in the wireless or wired manner. The input apparatus 6 outputs manipulation information exhibiting a result of the manipulation by the user A to the information processing apparatus 10. When receiving the manipulation information from the input apparatus 6, the information processing apparatus 10 reflects the manipulation information on processing in OS (system software) or game software, and causes a processing result to be outputted from the output apparatus 4. The information processing apparatus 10 may be a terminal apparatus such as a game apparatus which runs game software, or a personal computer. The input apparatus 6 may be an apparatus which supplies the information of the manipulation by the user A to the information processing apparatus 10 such as a game controller.

The auxiliary storage device 2 is a mass storage device such as a hard disc drive (HDD) or a flash memory. The auxiliary storage device 2 may be an external storage device which is connected to the information processing apparatus 10 by using a universal serial bus (USB) or the like, or may also be a built-in storage device. The output apparatus 4 may be a television set having a display which outputs an image and a speaker which outputs a sound, or may be a computer display. The output apparatus 4 may be connected to the information processing apparatus 10 by using a wired cable, or may be connected to the information processing apparatus 10 in the wireless manner.

The input apparatus 6 includes a plurality of input sections such as a plurality of push type manipulation buttons, an analog stick which can input an analog quantity, a rotary button, and the like. A camera 7 as an imaging apparatus is provided in the vicinity of the output apparatus 4, and images a space in the circumstance of the output apparatus 4. The information processing apparatus 10 has a function of facial-recognizing a user from an imaged image by the camera 7 and causing the user to log in.

Figure 2:
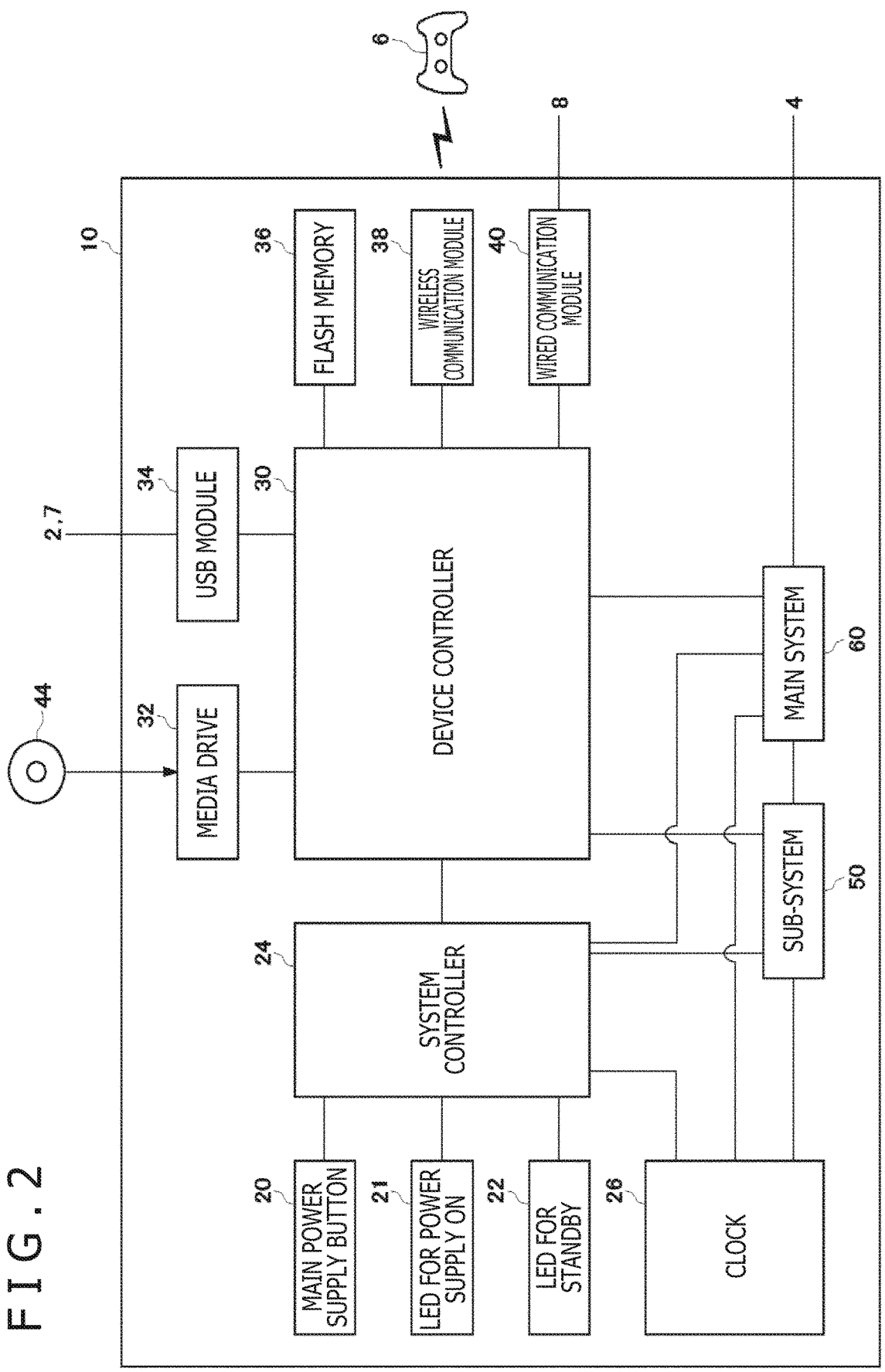
FIG. 2 is a diagram depicting a functional block of an information processing apparatus.

FIG. 2 depicts a functional block of the information processing apparatus 10. The information processing apparatus 10 includes a main power supply button 20, a light-emitting diode (LED) 21 for power supply ON, an LED 22 for standby, a system controller 24, a clock 26, a device controller 30, a media drive 32, a USB module 34, a flash memory 36, a wireless communication module 38, a wired communication module 40, a sub-system 50, and a main system 60.

The main system 60 includes a main central processing unit (CPU), a memory as a main storage device, a memory controller, a graphics processing unit (GPU), and the like. The GPU is mainly utilized in arithmetic operation processing in the game program. These functions may be configured as a system-on-chip and formed on one chip. The main CPU has a function of running game software recorded in the auxiliary storage device 2 or the ROM medium 44.

The sub-system 50 includes a sub-CPU, a memory as a main storage device, a memory controller, and the like, and does not include the GPU, and does not have a function of running the game software. The number of circuit gates of the sub-CPU is smaller than the number of circuit gates of the main CPU, and the power consumption in operation of the sub-CPU is less than the power consumption in operation of the main CPU. The sub-CPU operates even while the main CPU is in the standby state, and a processing function thereof is limited to keep the power consumption low.

The main power supply button 20 is a button with which a manipulation input from the user is performed. The main power supply button 20 is provided in a front surface of a chassis of the information processing apparatus 10 and is manipulated in order to turn ON or OFF the supply of the power supply to the main system 60 of the information processing apparatus 10. The LED 21 for power supply ON is lighted when the main power supply button 20 is turned ON, and the LED 22 for standby is lighted when the main power supply button 20 is turned OFF.

The system controller 24 detects depression of the main power supply button 20 by the user. The clock 26 is a real-time clock, and generates current date and time information and supplies the current date and time information to the system controller 24, the sub-system 50, and the main system 60.

The device controller 30 is configured as a large-scale integrated circuit (LSI) which performs the delivery of information between devices like a south bridge. As depicted in the figure, the devices such as a system controller 24, a media drive 32, a USB module 34, a flash memory 36, a wireless communication module 38, a wired communication module 40, a sub-system 50, and a main system 60 are connected to the device controller 30. The device controller 30 absorbs a difference in electrical characteristics between the respective devices, and a difference in data transfer speed between the respective devices and controls a timing of the data transfer.

The media drive 32 is equipped with the ROM medium 44 in which application software for the game or the like is recorded and drives the ROM medium 44, and reads out the program or the data from the ROM medium 44. The ROM medium 44 is a read only recording medium such as an optical disc, a magneto-optical disc, or a Blue-ray disc.

The USB module 34 is a module which is connected to an external apparatus by a USB cable. The USB module 34 may be connected to the auxiliary storage device 2 and the camera 7 by using the USB cables. The flash memory 36 is an auxiliary storage device constituting an internal storage. The wireless communication module 38 is a communication protocol such as a Bluetooth (registered trademark) protocol or an Institute of Electrical and Electronics Engineers (IEEE)802.11 protocol, and performs, for example, the wireless communication with the input apparatus 6. The wired communication module 40 performs the wired communication with an external apparatus, and is connected to the network via the AP 8.

The ROM medium 44 is mounted to the media drive 32, and reads the data from the ROM medium 44. It is to be noted that the recording medium which is to be mounted to the media drive 32 is not limited to the ROM medium 44, and may be a writable recording medium. Comparing a data reading speed of the auxiliary storage device 2 as the HDD or the flash memory, and a data reading speed of the media drive 32 with each other, the data reading speed of the auxiliary storage device 2 becomes relatively higher than the data reading speed of the media drive 32. Then, the information processing apparatus 10 of the embodiment copies the data from the ROM medium 44 to the auxiliary storage device 2, and reads out the file copied to the auxiliary storage device 2, thereby running the game.

Figure 3:
FIG. 3 is a view of assistance in explaining a recording file of a recording medium.

FIG. 3 is a view of assistance in explaining the recording file of the ROM medium 44. The ROM medium 44 is configured by recording game software, a patch file, and an additional content file.

The game software includes a resource file group, such as a startup file and a game program, for running a game, and a file group which the OS of the information processing apparatus 10 uses. The game program is a program necessary for running the game, and the game proceeds by running the game program. The startup file is a program for activating the game program. When the startup file is run, the game program is called to be run. The file group which the OS uses includes, for example, a game icon image or the like displayed on a menu picture in the information processing apparatus 10.

The game software has a tree type directory structure and the startup file is included in a route directory in a top layer. A sub-directory in a lower layer is classified every kind of file, and, for example, a sub-directory for a three-dimensional (3D) model, a sub-directory for a texture, a sub-directory for a script, and the like are formed. The respective sub-directories include the corresponding files. That is, the sub-directory for the 3D model includes a plurality of 3D model files, the sub-directory for the texture includes a plurality of texture files, and the sub-directory for the script includes a plurality of script files. For example, the subdirectory for the texture includes a texture file for a scenario 1 of a game, a texture file for a scenario 2 of the game, a texture file for a scenario 3 of the game, and the like.

The game software is logically divided into a plurality of groups. The files included in a plurality of sub-directories belong to the respective groups obtained through the logical division. That is, the respective groups are constituted by the files which are different in kind from one another, and are set in such a way that the files necessary for the information processing apparatus 10 to execute a specific unit such as a scene or a stage in a game belong to the groups.

The program file and the data file which are necessary for the activation of the game software belong to a first group as a head of the groups. Therefore, when the information processing apparatus 10 copies all the files belonging to the first group to the auxiliary storage device 2, the information processing apparatus 10 can activate the game software before copying the files in and after the subsequent second group. It is to be noted that after the information processing apparatus 10 acquires all the files belonging to the first group and activates the game software, the information processing apparatus 10 copies the files belonging to the subsequent group to the auxiliary storage device 2 in the background. In such a manner, the files which are minimum necessary for the running of the game are firstly copied to the auxiliary storage device 2, and at a time point at which these files become complete, the game is enabled to be run, whereby a waiting time of the user until the start of the play can be shortened.

The patch file is applied to the game software at the time of the running of the game software, and includes a game program in which a bug is corrected, a data file for changing a game function, and the like. The patch file has the same file structure as that of the game software, and may, for example, include a file which should be replaced with a file included in game software.

The additional content file includes a data file associated with a new content such as a scenario, a stage, a character, an item, or music. In general, in order to expand the view of the world of the game to give a user new enjoyment, the additional content file is provided from game manufacturers. For this reason, the additional content file is not included in the ROM medium 44 of the first edition of the game, but the additional content file shall be included in the ROM medium 44 which will be released in and after the issuance of the first edition with respect to the same game.

Figure 4:
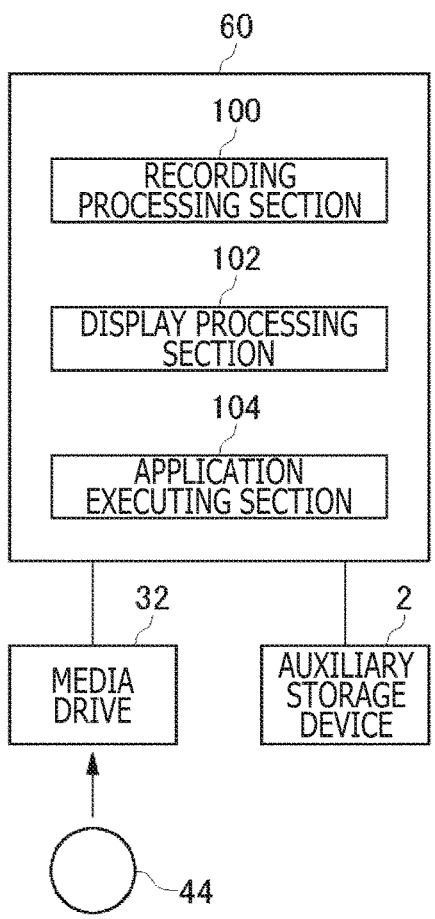
FIG. 4 is a diagram depicting a configuration of the information processing apparatus.

FIG. 4 depicts a configuration of the information processing apparatus 10. The main system 60 includes a recording processing section 100, a display processing section 102, and an application executing section 104. The recording processing section 100 has a function of copying the file recorded in the ROM medium 44 to the auxiliary storage device 2. In regards to a hardware component, although these configurations are realized by a CPU, a memory, a program loaded into the memory, the storage and the like of an arbitrary computer, in this case, a functional block realized by cooperation of them is drawn. Therefore, it is understood by a person skilled in the art that these functional blocks can be realized in various forms by only the hardware, the software, or a combination thereof. It is to be noted that these configurations may be realized by the function of the OS.

First, the user A mounts the newly purchased ROM medium 44 depicted in FIG. 3, that is, the ROM medium 44 in which the file, the patch file, and the additional content file constituting the game software to the media drive 32. When the ROM medium 44 is mounted to the media drive 32, the recording processing section 100 copies the file recorded in the ROM medium 44 to the auxiliary storage device.

At this time, the recording processing section 100 reads out the data from the ROM medium 44 in order of the files constituting the patch file, the additional content file, and the game software, and copies the data thus read out to the auxiliary storage device 2. In other words, the recording processing section 100 copies the patch file first, then the recording processing section 100 copies the additional content file. After the recording processing section 100 copies the additional content file, the recording processing section 100 copies the file constituting the game software. It is to be noted that in the case where the same additional content file is previously present in the auxiliary storage device 2, the recording processing section 100 does not copy the additional content file of interest.

After the recording processing section 100 copies the pitch file and the additional content file in this order, the recording processing section 100 starts to copy the game software. When the recording processing section 100 copies all the files, of the game software, belonging to the first group, the application executing section 104 becomes a state in which the application executing section 104 can activate the game software before the application executing section 104 copies the files in and after the second group. For this reason, the patch file and the additional content file are copied before the activation of the game software, resulting in that at a time point at which all the files belonging to the first group are copied, and the application executing section 104 becomes able to activate the game software. In other words, when the files belonging to the first group are copied to the auxiliary storage device 2, the application executing section 104 applies the patch to the game software, and can run the game software in a state in which the additional content file is utilized.

It is to be noted that right information for activation of the game is recorded in the ROM medium 44. For this reason, even after the application executing section 104 copies all the files in the ROM medium 44 to the auxiliary storage device 2, it may be impossible for the application executing section 104 to run the game unless there is obtained a state in which the ROM medium 44 is mounted to the media drive 32. In order to execute the game software copied to the auxiliary storage device 2, the ROM medium 44 needs to be mounted to the media drive 32.

It is to be noted that the ROM medium 44 depicted in FIG. 3 is set on the assumption that one kind of game software is recorded in the ROM medium 44. In this case, as described above, when the ROM medium 44 is mounted to the media drive 32, the recording processing section 100 performs the automatic copy of all the files which can be copied.

It is to be noted that the ROM medium 44 records a plurality of kinds of game software in some cases. When the ROM medium 44 which records a plurality of kinds of game software is mounted to the media drive 32, the recording processing section 100 does not behave so as to automatically copy all the files to the auxiliary storage device 2. In this case, when the ROM medium 44 which records a plurality of kinds of game software is mounted to the media drive 32, and the recording processing section 100 receives the manipulation for selection of the game by the user A, the recording processing section 100 performs the copy of the file of the selected game software, the patch file which is applied to the game software of interest, and the additional content file which the application software of interest utilizes. In other words, in the case where the ROM medium 44 records a plurality of kinds of game software, when the game is selected by the user A, the recording processing section 100 copies the file associated with the selected game of interest.

It is to be noted that one additional content can be utilized by a plurality of games in some cases. For example, there is the case where an additional content A is utilized in both game software B and game software C which are recorded in the ROM medium 44. When the game software B is selected by the user, the recording processing section 100 copies the file associated with the game software B to the auxiliary storage device 2. At this time, the additional content A becomes a state in which it is copied. For this reason, when after that, the recording processing section 100 copies the file associated with the game software C, since the additional content A is previously copied, the additional content A needs not to be copied again.

It is to be noted that the user A downloads the additional content of the same game from the content server in some cases. In the case where the additional content file of the same game downloaded from the content server is stored in the auxiliary storage device 2, in the state in which the ROM medium 44 is mounted to the media drive 32, the game software can utilize both the additional content file which is copied from the ROM medium 44 to the auxiliary storage device 2, and the additional content file which is downloaded from the content server into the auxiliary storage device 2. For example, when a game manufacturer releases a new additional content after the user A acquires the ROM medium 44, the user A downloads the new additional content file from the content server. For this reason, the game software is configured in such a way that not only the additional content file copied from the ROM medium 44, but also the additional content file downloaded from the content server can be utilized.

The display processing section 102 displays a list of the additional content which the game software can use in the state in which the ROM medium 44 is mounted to the media drive 32.

Figure 5:
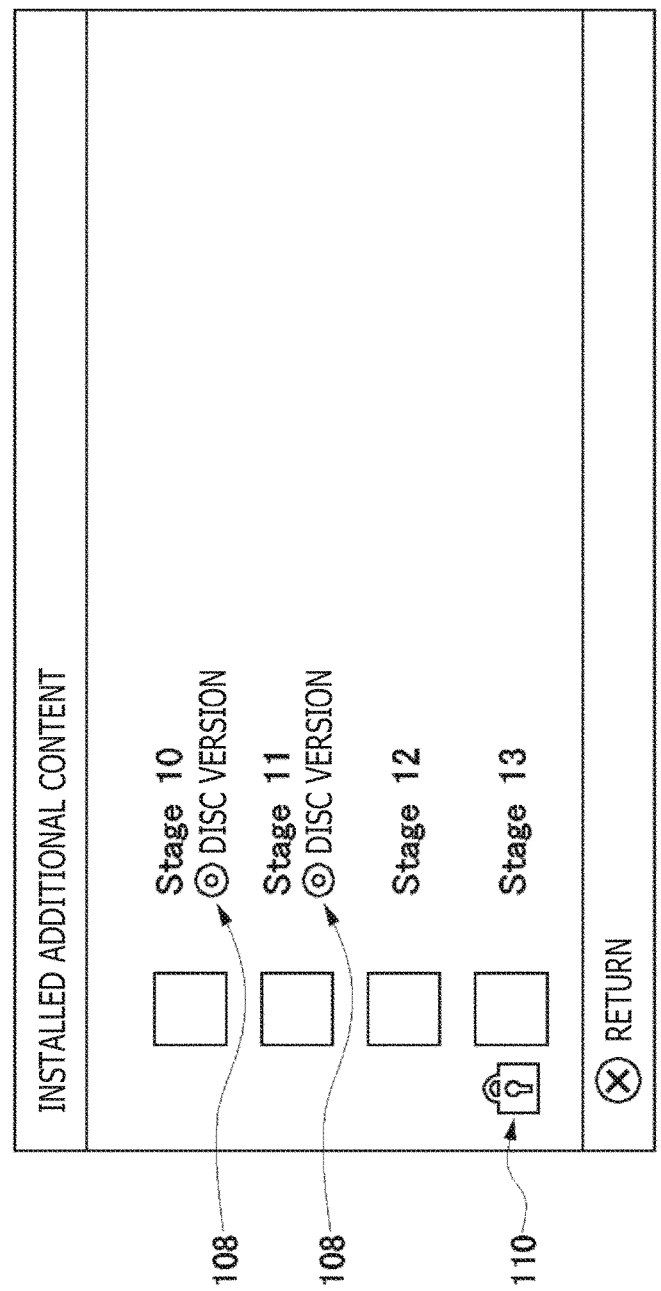
FIG. 5 is a diagram depicting an example of display of an additional content list installed in an auxiliary storage device.

FIG. 5 depicts an example of display of a list of the additional content which is installed in the auxiliary storage device 2 with respect to a certain game. In this case, a scenario file of stages 10 to 13 is installed as the additional content.

Here, the display processing section 102 displays information exhibiting the additional content copied from the ROM medium 44 for the additional content copied from the ROM medium 44 to the auxiliary storage device 2. In this case, disc marks 108 are added to the additional contents of stages 10 and 11. Hereby, the user A can recognize that the additional contents of the stages 10 and 11 are acquired from the ROM medium 44.

It is to be noted that the disc mark 108 is not added to each of the additional contents of the stages 12 and 13. Therefore, the user A can recognize that the additional contents of the stages 12 and 13 are acquired by the download from the content server.

The display processing section 102 performs the display in such a way that a lock mark 110 is added to the additional content which may be impossible for the user A to use. Limited users such as a user who performs the downloaded and his/her family have a right of use of the additional content downloaded from the content server, and any of users other than the limited users has not the right of use. For this reason, the display processing section 102 needs to add the lock mark 110 to the additional content which may be impossible for the user A to use to make the user A recognize that it may be impossible for him/her to use the additional content having the lock mark 110 added thereto.

The embodiment described above is an exemplification, and it is understood by a person skilled in the art that various modified changes can be made in a combination of the constituent elements and the processing processes of the embodiment, and such modified changes also fall within the scope of the present invention. Although in the embodiment, the game is described as the example of the application, any of applications other than the game may also be valid.

REFERENCE SIGNS LIST

1 . . . Information processing system, 2 . . . Auxiliary storage device, 10 . . . Information processing apparatus, 44 . . . ROM medium, 60 . . . Main system, 100 . . . Recording processing section, 102 . . . Display processing section, 104 . . . Application executing section.

INDUSTRIAL APPLICABILITY

The present invention can be utilized in an information processing apparatus such as a game apparatus.

The invention claimed is:

1. An information processing apparatus, comprising:
   a drive device to which a recording medium in which an executable file constituting application software and an additional content file usable by the application software are recorded is mounted; and
   a recording processing section copying the additional content file recorded in the recording medium to an auxiliary storage device,
   wherein, after copying the additional content file to the auxiliary storage device, the recording processing section copies the file constituting the application software to the auxiliary storage device, wherein:
   the recording medium further comprises a patch file for the application software,
   the file constituting the application software, the patch file, and the additional content file are grouped together in a first group of files,
   the information processing apparatus runs the application software when copying the first group of files to the auxiliary storage device is complete, and
   a second group of files for the application software is copied to the auxiliary storage device while the application software is running.

2. The information processing apparatus according to claim 1, wherein, in a case where the additional content file of the same application downloaded from a content server is stored in the auxiliary storage device, in a state in which the recording medium is mounted to the drive device, the application software is capable of utilizing both the additional content file copied from the recording medium to the auxiliary storage device and the additional content file downloaded from the content server into the auxiliary storage device.

3. The information processing apparatus according to claim 1, further composing: a display processing section displaying a list of the additional content which the application software is usable in the state in which the recording medium is mounted to the drive device.

4. The information processing apparatus according to claim 3, wherein the display processing section displays information exhibiting the additional content copied from the recording medium for the additional content copied from the recording medium to the auxiliary storage device.

5. The information processing apparatus according to claim 1, wherein
the recording processing section performs, when the recording medium in which one kind of application software is recorded is mounted to the drive device, automatic copy of all the films which is capable of being copied, and
the recording processing section performs, when the recording medium in which a plurality of kinds of application software is recorded is mounted to the drive device, and a manipulation of selection of the application by a user is received, copy of the file of the selected application software and the additional content file which the application software of interest utilizes.

6. A file copying method of copying a file from a recording medium to an auxiliary storage device, the method comprising:
reading out an additional content file from the recording medium in which an executable file constituting application software and the additional content file are recorded, and copying the additional content file thus read out to the auxiliary storage device, wherein the additional content file is usable by the application software; and
reading out, after end of the copy of the additional content file, the file constituting the application software from the recording medium of interest, and copying the file thus read out to the auxiliary storage device, wherein:
the recording medium further comprises a patch file for the application software,
the file constituting the application software, the patch file, and the additional content file are grouped together in a first group of files,
an information processing apparatus runs the application software when copying the first group of files to the auxiliary storage device is complete, and
a second group of files for the application software is copied to the auxiliary storage device while the application software is running.

7. A non-transitory, computer readable storage medium containing a program, which when executed by a computer, causes the computer to carry out actions, comprising:
reading out an additional content file from a recording medium in which an executable file constituting application software and the additional content file are recorded, and copying the additional content file thus read out to an auxiliary storage device, wherein the additional content file is usable by the application software; and
reading out, after end of the copy of the additional content file, the file constituting the application software from the recording medium of interest, and copying the file thus read out to the auxiliary storage device, wherein:
the recording medium further comprises a patch file for the application software,
the file constituting the application software, the patch file, and the additional content file are grouped together in a first group of files,
an information processing apparatus runs the application software when copying the first group of files to the auxiliary storage device is complete, and
a second group of files for the application software is copied to the auxiliary storage device while the application software is running.

\* \* \* \* \*